UNITED STATES PATENT OFFICE.

ISAAC BROWN, OF ELM CROFT GRANGE, EDINBURGH, SCOTLAND.

FERTILIZER.

SPECIFICATION forming part of Letters Patent No. 253,971, dated February 21, 1882.

Application filed November 21, 1881. (No specimens.) Patented in England November 26, 1878.

*To all whom it may concern:*

Be it known that I, ISAAC BROWN, a subject of the Queen of Great Britain, and residing at Elm Croft Grange, Edinburgh, Scotland, have invented certain Improvements in the Production of Manure, (for which I have obtained a patent in Great Britain, No. 4,804, dated 26th November, 1878,) of which the following is a specification.

My said invention has for its object the production at a cheap rate of a product or manurial product capable of exercising a beneficial chemical action upon mineral and organic constituents, and one more powerful upon land for agricultural purposes than other chemically-prepared manures, and surpassing in its effect that obtained by manurial products at present in use—such, for example, as superphosphate of lime or similar manures having sulphates in their compositions.

In carrying out my invention in order to effect this object I employ what I designate "supersulphates," the same being composed of sulphuric acid and of natural gypsum, or sulphate of lime, which is capable of carrying a large proportion of sulphuric acid in a free state as a solid, and in a form admitting of its being more conveniently conveyed from place to place, and more suitable for its being uniformly distributed over the land and for the treatment of certain manurial products than liquid acid, and in order to give greater facilities for the use of sulphuric acid than has hitherto been obtained for producing the above chemical action; or I substitute for gypsum or sulphate of lime any other suitable substance or medium—such, for example, as peat, earth, or any equivalent material—the said substitute, when combined with sulphuric acid or with a further proportion of sulphuric acid, forming what I term a "supersulphate" or "supersulphate manure," to be used for the purposes before mentioned. The supersulphate contains the acid in a form convenient and advantageous not only for transportation and for distribution over the land in a free state, but also for admixture with alkaline substances and other manurial matters. When gypsum is employed I mix sulphuric acid therewith in the proportion of, say, about one-fourth part, by weight, of commercial sulphuric acid, or as much as it will carry as a convenient portable substance, to about three parts, by weight, of gypsum, so as to form what I term a "supersulphate." When other salts or media are used as substitutes for gypsum, as before mentioned, they are combined with sulphuric acid in a similar manner, the quantity of such salts or media used being varied in the inverse ratio of the proportion of sulphuric acid which they contain, (when sulphuric acid is present in them.) In all cases such a proportion of sulphuric acid is used as to produce a substance of a conveniently portable form for distribution as a manure and chemical reagent to soils, or manurial products, such as ground bones, phosphates, guanos, kainit salt, farmyard dung, or for application to cow-houses, stables, and piggeries; but I do not confine myself in the proportion of acid used to any specific formula.

By means of my invention not only is the requisite amount of sulphuric acid supplied as the food for the crops, but the manure produces a powerful and beneficial chemical action upon all the alkalies and alkaline earths of the soil, changing them from their natural inert condition to more active manurial products, which enhances the value of the supersulphate manure for agricultural purposes.

The supersulphate as a reagent and more convenient portable form of sulphuric acid than that of liquid acid is of the utmost importance in the preparation of ground bones, phosphates, guanos, kainit salt, farm-yard and other manures in changing them into a better condition and adding to their composition a sulphate at the least possible cost, thus at all times producing a beneficial effect and rendering other manurial products more valuable for agricultural purposes.

I lay no claim herein to the admixture of sulphuric acid with ground bones or like manurial product, as this has long been done; nor do I claim the addition of absorbent materials to dissolved bones or soluble phosphates; but,

Having now described and particularly ascertained the nature of my said invention and the manner in which the same is or may be used or carried into effect, I would observe in con- clusion that what I consider to be novel and original, and therefore claim as my invention, is—

As a manure or ingredient of manure, the product herein denominated "supersulphate," said product consisting of a solid mixture of sulphuric acid and gypsum, peat, or equivalent medium, substantially as described.

In testimony whereof I have signed my name to this specification in the presence of two subscribing witnesses.

ISAAC BROWN.

Witnesses:
J. A. LEONARD,
H. C. PEACOCK,
*Both of Leith, Scotland.*